United States Patent [19]
Ozawa

[11] Patent Number: 5,838,130
[45] Date of Patent: Nov. 17, 1998

[54] LOCOMOTION CONTROL SYSTEM OF LEGGED MOBILE ROBOT

[75] Inventor: Nobuaki Ozawa, Saitama, Japan

[73] Assignee: Honda Giken Kogyo Kabushiki Kaisha, Tokyo, Japan

[21] Appl. No.: 787,708

[22] Filed: Jan. 24, 1997

[30] Foreign Application Priority Data

Jan. 25, 1996 [JP] Japan .................................. 8-031365

[51] Int. Cl.⁶ .................................................. B62D 57/02
[52] U.S. Cl. ................................. 318/568.2; 318/568.12; 318/568.17; 180/8.1; 180/8.6; 901/1; 901/48
[58] Field of Search .......................... 318/568.1, 568.15, 318/568.12, 568.2, 566, 568.17; 901/1, 48, 50; 395/152, 81; 74/479 B, 479 BE, 479 BP, 479 BF, 479 BJ, 479 BW, 479.01; 364/443; 180/8.1, 8.5, 8.6

[56] References Cited

U.S. PATENT DOCUMENTS

| | | | |
|---|---|---|---|
| 4,834,200 | 5/1989 | Kajita | 901/1 |
| 5,255,753 | 10/1993 | Nishikawa et al. | 180/8.6 |
| 5,402,050 | 3/1995 | Ozawa | 318/568 |
| 5,455,497 | 10/1995 | Hirose et al. | 318/568.12 |
| 5,459,659 | 10/1995 | Takenaka | 318/568.12 |
| 5,483,630 | 1/1996 | Unuma et al. | 395/152 |

FOREIGN PATENT DOCUMENTS 5-318342   5/1993   Japan .

*Primary Examiner*—John W. Cabeca
*Attorney, Agent, or Firm*—Lyon & Lyon LLP

[57] ABSTRACT

A system for controlling locomotion of a legged mobile robot, more particularly stair descending of a biped mobile robot having a body and two articulated legs each connected to the body through hip joints and each including a foot connected to the leg through ankle joints. Gait parameters are generated such that the foot should be landed on a stair step from its heel and is kept in surface-contact or in point-contact by at least three points. The stair descending is then controlled using the generated gait parameters. With the arrangement, the system makes it possible to control the robot locomotion such that the robot descends stairs with a stable posture even when the foot length is greater than the stair step depth. This also makes it possible to design the size of the foot independent of the size of the stairs. Moreover, the tolerance of positional errors is increased, increasing the number of stair steps that the robot descends continuously keeping a stable posture.

14 Claims, 18 Drawing Sheets

5,838,130

LOCOMOTION CONTROL SYSTEM OF LEGGED MOBILE ROBOT

BACKGROUND OF THE INVENTION

1. Field of the Invention

The present invention relates to a system for and a method of controlling the locomotion of a legged mobile robot, and more particularly to a system for and a method of controlling the locomotion of a biped mobile robot which allows the robot to walk up and down stairs with a stable posture.

2. Description of the Related Art

Various legged mobile robots have hitherto been proposed and are expected to carry out tasks in the same environment as that of human beings including stairs. Since the landing position of the robot feet is restricted with stairs, it is difficult for a legged mobile robot, in particular for a biped mobile robot to ascend or descend the stairs with a stable posture. For that reason, the assignee proposed locomotion control systems of a legged mobile robot in Japanese Laid-Open Patents application No. Hei 5(1993)-318,342 and U.S. Pat. No. 5,402,050. The system described in the US patent discloses controlling the locomotion of the legged mobile robot such that positional errors, if accumulated, in foot landing do not exceed a tolerance when ascending or descending the stairs.

When a human being descends stairs, he places his free foot on a a step (tread) from his tiptoe, raising or lifting the heel of the free foot and of the foot supporting his weight on a upper step. With this, he can absorb the impact occurring at the foot landing and goes down the stairs in a smooth motion in which his joints suffer little load. If one tries to descend stairs with his heel first landing on a step, he will experience a large foot landing impact which makes it difficult to walk down the stairs in a smooth motion.

The biped mobile robots are required to work in the same environment as that of human beings including stairs. The stairs are usually designed and built with the size of ordinary human beings in mind. However, designing the robot at a practical size, its foot length would be longer than an ordinary human foot length. If the robot foot length is not less than the stair step (tread) depth (length), and when the robot takes the same stair descending motion as that of a human being, the robot foot would hit an upper step if the foot landing position is shorter than desired. Or the robot would miss to land on the stairs if the foot landing position is longer than desired.

The working environments such as stairs have thus little margin for positional errors in foot landing. Nevertheless, the occurrence of such a positional error will be unavoidable while controlling the locomotion of a legged mobile robot.

BRIEF SUMMARY OF THE INVENTION

An object of the present invention is to provide a system for and a method of controlling the locomotion of a legged mobile robot, more particularly a biped mobile robot, which allows the robot to descend stairs in a human working environment with a stable posture, even when the robot foot length is not less than the stair step depth.

In order to achieve the object, there is provided a system for controlling locomotion of a legged mobile robot having at least a body and a plurality of articulated legs each connected to the body through a joint and each including a foot connected to the leg through a joint, the robot being configured to drive the legs to kick a floor to walk in an environment including stairs, comprising gait parameter generating means for generating gait parameters of the robot such that the robot descends the stairs by landing the foot on a stair step from a heel of the foot; posture parameter determining means for determining posture parameters of the robot based on the generated gait parameters; joint angle determining means for determining desired angles of the joints based on the determined posture parameters by inverse kinematic solution; and servo control means for controlling an actuator of each joint in response to the determined desired angles of the joints.

According to another aspect of the invention, there is provided a method of controlling locomotion of a legged mobile robot having at least a body and a plurality of articulated legs each connected to the body through a joint and each including a foot connected to the leg through a joint, the robot being configured to drive the legs to kick a floor to walk in an environment including stairs, comprising the steps of generating gait parameters of the robot such that the robot descends the stairs by landing the foot on a stair step from a heel of the foot; determining posture parameters of the robot based on the generated gait parameters; determining desired angles of the joints based on the determined posture parameters by inverse kinematic solution; and servo controlling an actuator of each joint in response to the determined desired angles of the joints.

BRIEF DESCRIPTION OF THE DRAWINGS

These and other objects and advantages of the invention will be more apparent from the following description and drawings, in which.

DETAILED DESCRIPTION OF THE PREFERRED EMBODIMENTS

Embodiments of the invention will now be explained taking a biped mobile robot as example of the legged mobile robot.

Figure 1:
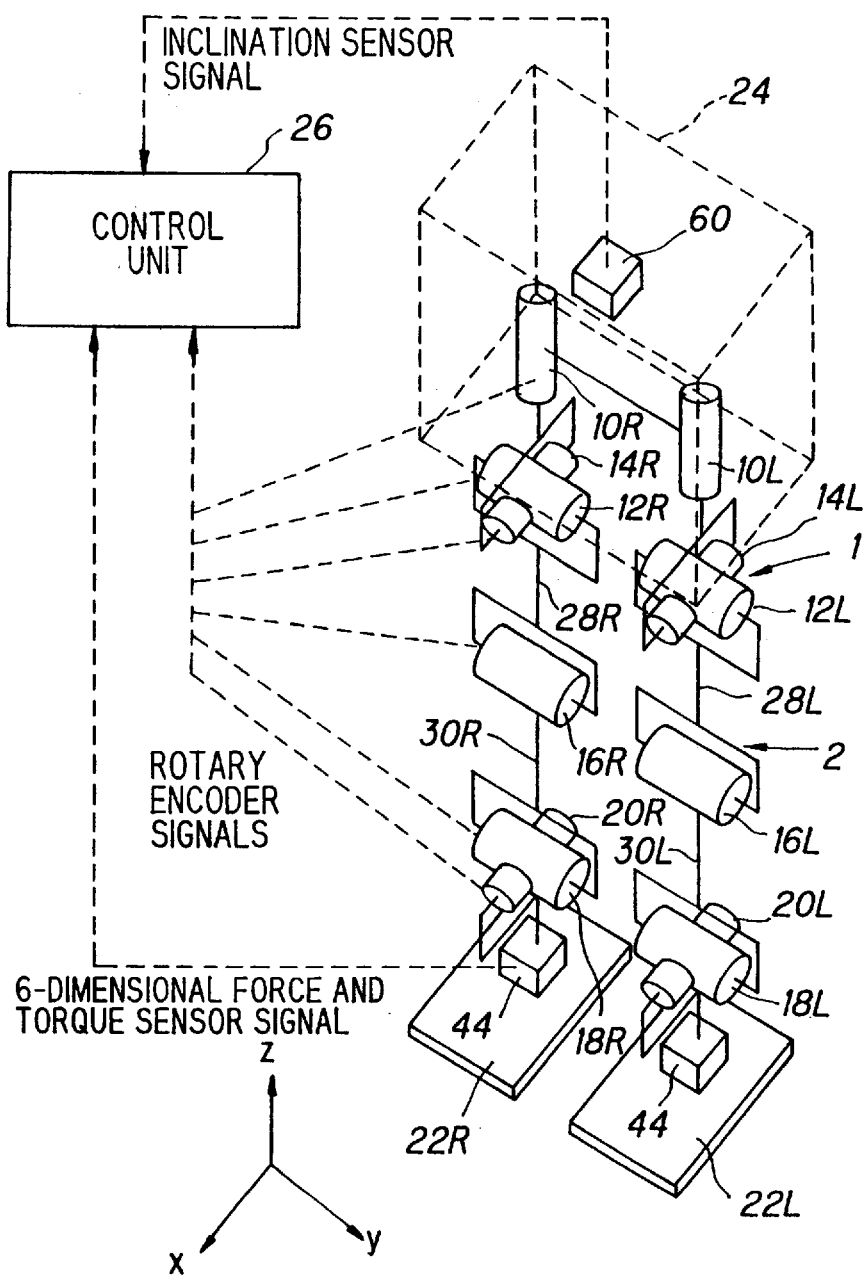
FIG. 1 is a skeleton diagram showing the overall configuration of the locomotion control system of a legged mobile robot according to the present invention taking a biped mobile robot as example.

FIG. 1 shows a skeleton diagram of a biped mobile robot or two-legged walking robot 1 in its entirety which has a pair of laterally spaced articulated legs (leg links) 2 each composed of six joints. For an easier understanding, each of the joints is represented by an electric motor which actuates the joint. The joints include, arranged successively downward, a pair of joints 10R, 10L (the right-hand joint is indicated by R and the left-hand joint by L) for turning legs with respect to a hip, a pair of joints 12R, 12L for rolling movement with respect to the hip about a y-axis within a sagittal plane, a pair of joints 14R, 14L for pitching movement with respect to the hip about an x-axis within a frontal plane, a pair of joints 16R, 16L for rolling movement with respect to knees, a pair of joints 18R, 18L for rolling movement with respect to feet 22R(L), and a pair of joints 20R(L) for pitching movement with respect to the foot 22R, 22L.

The robot 1 has a body (trunk) 24 in its uppermost portion which houses therein a control unit 26 comprising microcomputers which will be described later on with reference to FIG. 3. The joints 10R(L), 12R(L), 14R(L) make up hip joints, and the joints 18R(L), 20R(L) make up ankle joints. The hip joints and knee joints are connected to each other by thigh links 28R, 28L, and the knee joints and ankle joints are connected to each other by crus links 30R, 30L.

With the above structure, each of the legs 2 is given six degrees of freedom. When the 6×2=12 joints are driven to suitable angles while the robot 1 is walking, a desired motion is imparted to the entire legs to cause the two-legged walking robot 1 to walk arbitrarily in a three-dimensional environment including stairs. The robot thus having at least a body, two articulated legs each connected to the body through a hip joint and each including a thigh link, a crus link connected to the thigh link through a knee joint and a foot connected to the crus link through an ankle joint, is configured to drive the articulated legs as a foreleg and a hind leg such that the hind leg kicks the ground to walk in a direction alternating a single-leg support phase in which one of the two legs supports weight of the robot and a double-leg support phase in which the two legs support the weight of the robot.

Figure 2:
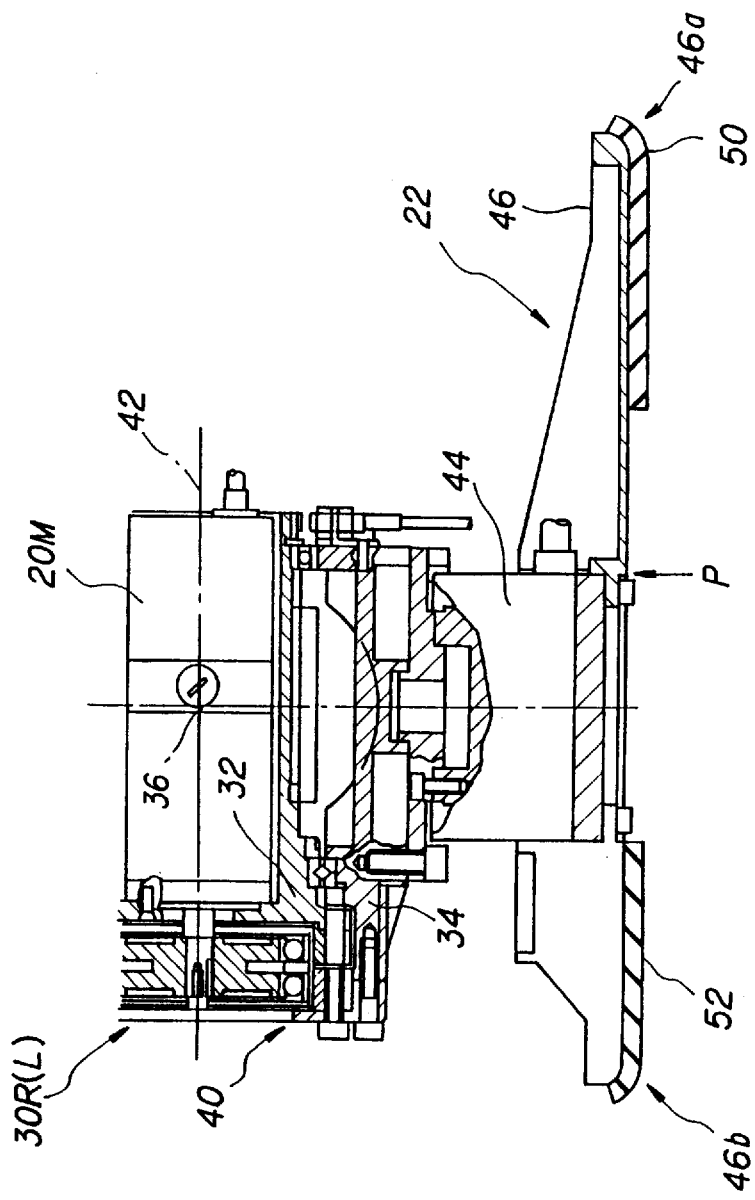
FIG. 2 is a cross-sectional view showing the detailed configuration of a foot of the biped mobile robot illustrated in FIG. 1.

FIG. 2 shows a detailed configuration of each of the ankle joints 18, 20 R(L) and the foot 22R(L) in a cross section taken along the sagittal plane. The output power from an electric motor (not shown in FIG. 2) which actuates the ankle joint 18 is applied to an input end of a harmonic drive speed reducer (not shown in FIG. 2), and reduced in speed and increased in torque at a suitable magnification in a known fashion for rotating a fixed member 32 attached to the crus link 30 and a rotary member 34 underneath the fixed member 32 in a forward direction in walking (within the sagittal plane) about an axis 36 (aligned with the axis of the ankle joint 18R(L)), thereby tilting or inclining the foot 22R(L) in the forward direction.

An electric motor 20M for driving the ankle joint 20 is disposed perpendicularly to the axis 36. The output power from the electric motor 20M is applied to a second harmonic drive speed reducer 40 for rotating the fixed member 32 and the rotary member 34 in a lateral direction (within the frontal plane) normal to the forward direction about a second axis 42 (aligned with the axis of the ankle joint 20R(L)), thereby tilting or inclining the foot 22R(L) in the lateral direction. The structural details of the above robot including the ankle joints are described in U.S. Pat. No. 5,255,753 filed by the assignee, and hence will not be described in further detail.

A known six-dimensional force and torque sensor 44 is disposed below the rotary member 34 for measuring three directional components Fx, Fy, Fz of force and three directional components Mx, My, Mz of torque or moment thereby to detect whether the foot 22R(L) has landed or not, or a load or force acting the robot through the foot assembly when it contacts the ground. The foot 22R(L) has a flat frame 46 which is positioned beneath the six-dimensional force and torque sensor 44. The frame 46 has a lower surface (foot sole) which is substantially flat, and includes a tiptoe 46a and a heel 46b to which resilient members 50, 52 are attached for dampening shocks (floor reaction force) that are imposed when the foot is landed.

The body 24 has an inclination sensor 60 for detecting a tilt or inclination in the frontal plane with respect to a z-axis (the direction of gravity) and its angular velocity, and also a tilt in the sagittal plane with respect to the z-axis and its angular velocity. The electric motors of the respective joints are coupled with respective rotary encoders for detecting angular displacements of the electric motors. Although not shown in FIGS. 1 and 2, optical detectors of a non-contact and reflection-type are provided at the foot 22R(L) for detecting the foot landing position, which will later be explained.

In addition, although not shown in FIG. 1, a zero reference switch 62 (see FIG. 3) for correcting an output signal from the inclination sensor 60 and a limit switch 64 (see FIG. 3) for fail-safe operation are disposed in suitable positions on the robot 1. Output signals from the six-dimensional force and torque sensors 44, the inclination sensor 60, the rotary encoders, the zero reference switch 62, and the limit switch 64 are sent to the control unit 26 in the body 24.

Figure 3:
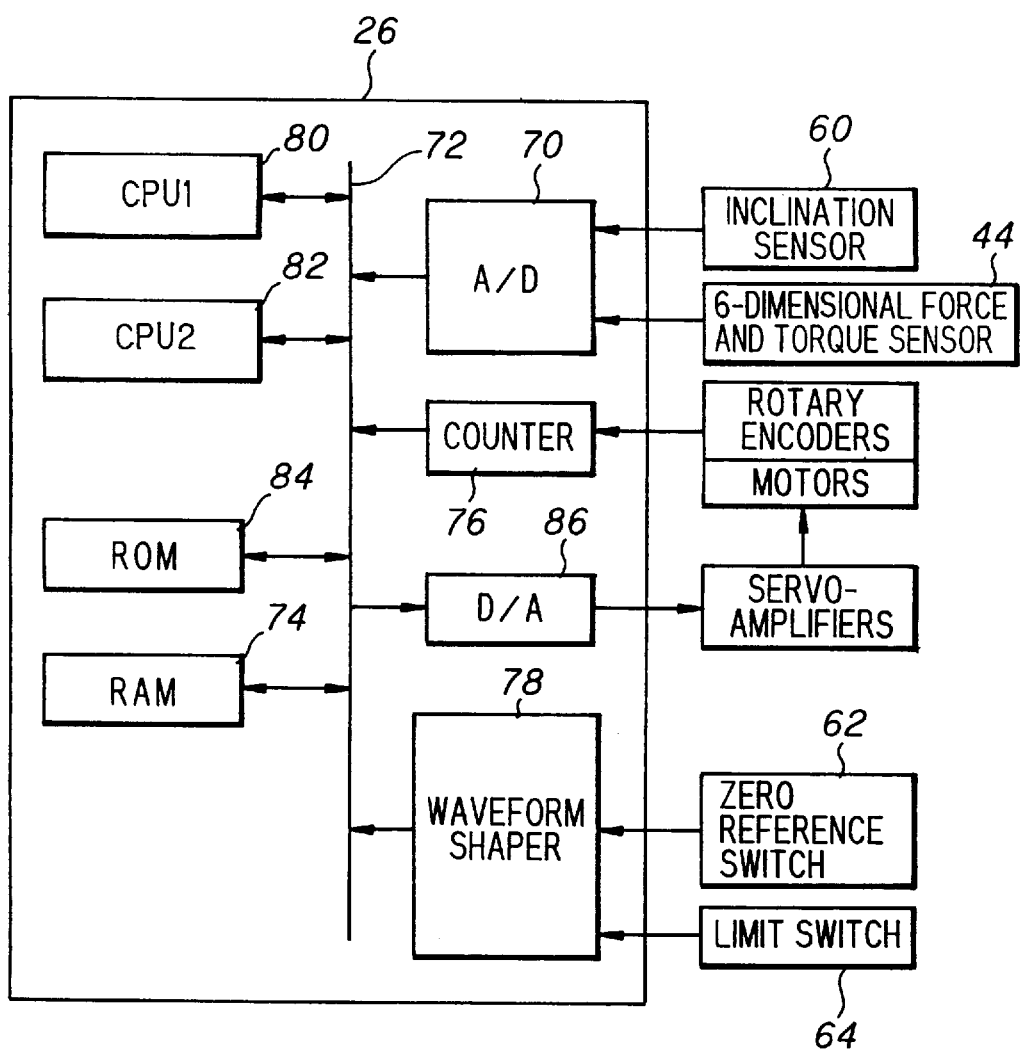
FIG. 3 is a block diagram showing details of a control unit illustrated in FIG. 1.

FIG. 3 shows in block diagram details of the control unit 26, which comprises microcomputers. Output signals from the sensors 44 and the inclination sensor 60 are converted by an A/D converter 70 into digital signals, which are transmitted through a bus 72 to a RAM 74. Output signals from the rotary encoders that are disposed adjacent to the respective electric motors are supplied through a counter 76 to the RAM 74. Output signals from the zero reference switch 62 and the limit switch 64 are transmitted through a waveform shaper 78 and stored in the RAM 74.

The control unit 26 includes first and second CPUs 80, 82. The first CPU 80 reads gait parameters which are generated in a manner described later on and stored in a ROM 84, calculates desired joint angles, and outputs the calculated desired joint angles to the RAM 74. The second CPU 82 reads the desired joint angles and detected measured values from the RAM 74 as described later on, calculates manipulated variables (control inputs) necessary to drive the joints, and outputs the calculated manipulated variables through a D/A converter 86 and servo-amplifiers to the electric motors which actuate the respective joints.

Figure 4:
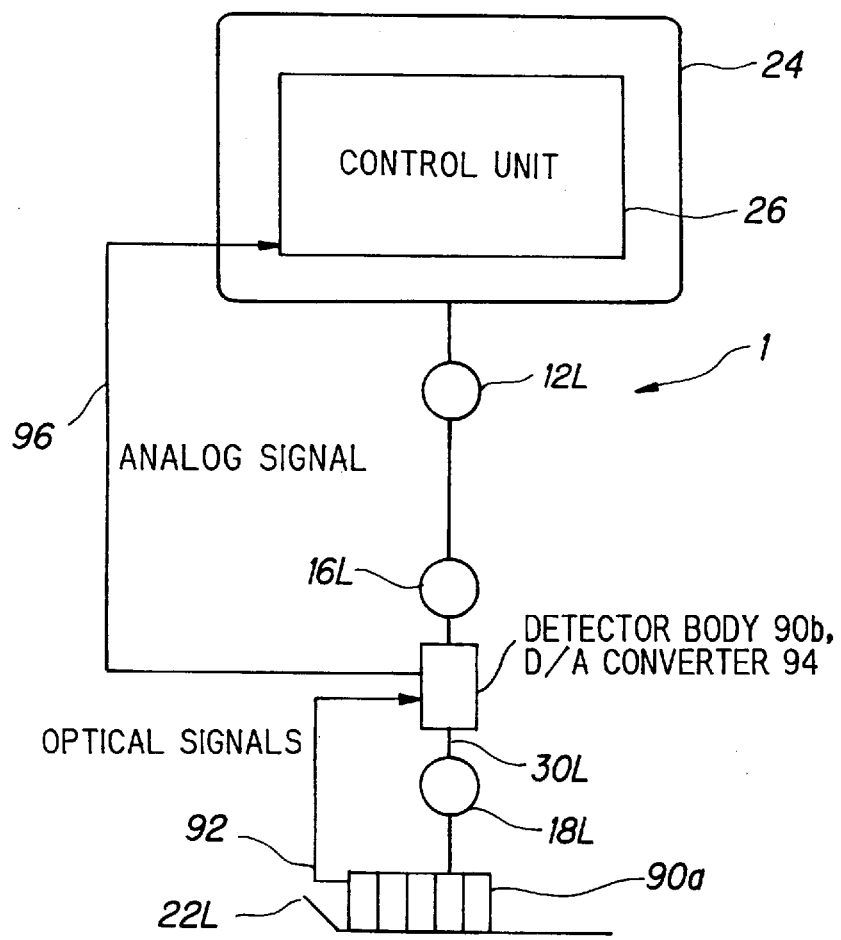
FIG. 4 is a side view of the robot illustrated in FIG. 1 showing the location of optical detectors.

The optical detectors 90 referred to earlier will now be explained with reference to FIGS. 4 and 5. Each optical detector 90 comprises of detectors 90a and a detector body 90b. Five detectors 90a are disposed in a line array on both sides of each foot 22R(L) and detects reflected light from the floor surface, emitted by a light emitter. The detectors 90a are connected with the detector body 90b via an optical fiber cable 92 and transmit optical signals (reflected light) to the detector body 90b. The detector body 90b is housed in the crus link 30R(L) and converts the optical signal to an electric signal (digital signal).

In addition, a single D/A converter 94 is installed inside each crus link 34R(L) in the vicinity of the detector body 90b. The D/A converter 94 converts the outputs from each array of five optical detectors 90a into a single analog signal and transmits it to the A/D converter 70 in the control unit 26 via a cable 96. In the control unit, the first CPU 80 reads data from the A/D converter 70 via the bus 72 and appropriately carries out data processing to determine the output states (ON/OFF states) of the 20 optical detectors 90a installed on the both sides of the right and left feet 22R(L). (The optical detectors are ON when they receive the reflected light.)

Figure 5:
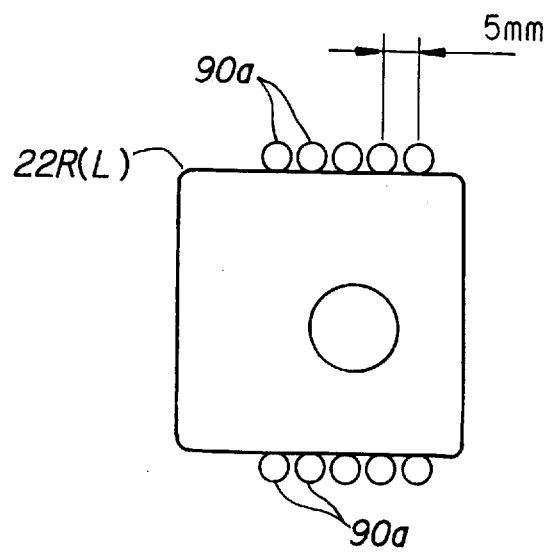
FIG. 5 is a plan view of the foot of the robot illustrated in FIG. 4 showing the detailed location of the optical detectors installed at the foot.
Figure 6:
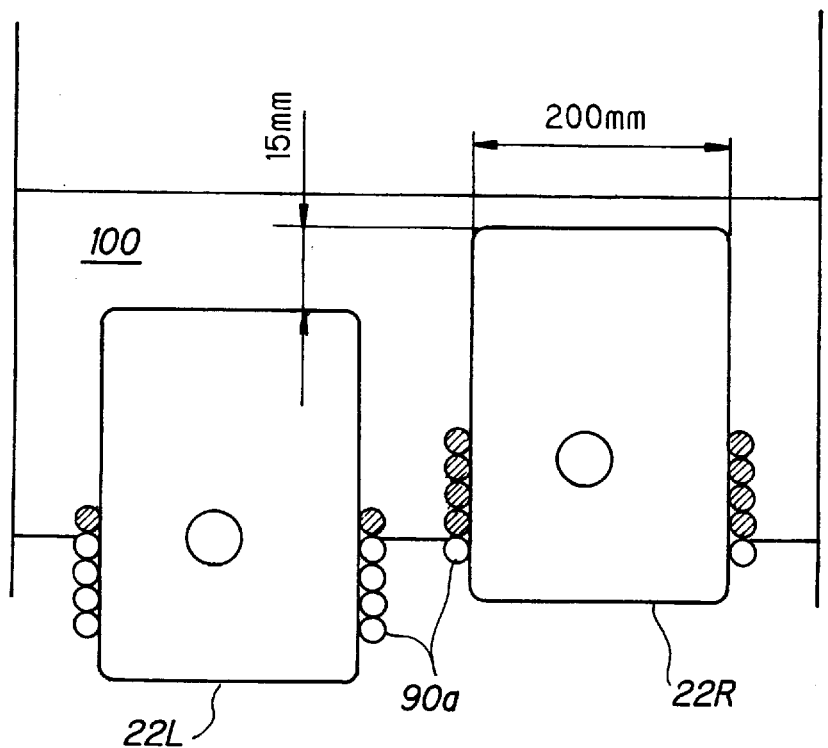
FIG. 6 is an explanatory plan view of the robot foot illustrated in FIG. 5 landed on a step (tread) of stairs showing an extended detection range of the optical detectors when a landmark is provided on the step.

As shown in FIG. 5, the distance between the centers of adjacent optical detectors 90a in each array of five is 5 mm. The width of the foot 22R(L) is 200 mm as illustrated in FIG. 6. Since no positional information can be obtained when all of the detectors on one side of the foot are ON or OFF, each detector array is arranged such that when, for example, the edge of a stair step (tread) is to be detected as shown in FIG. 6, the detection range corresponding to between 1 and 4 detectors being ON is up to 15 mm.

Figure 7:
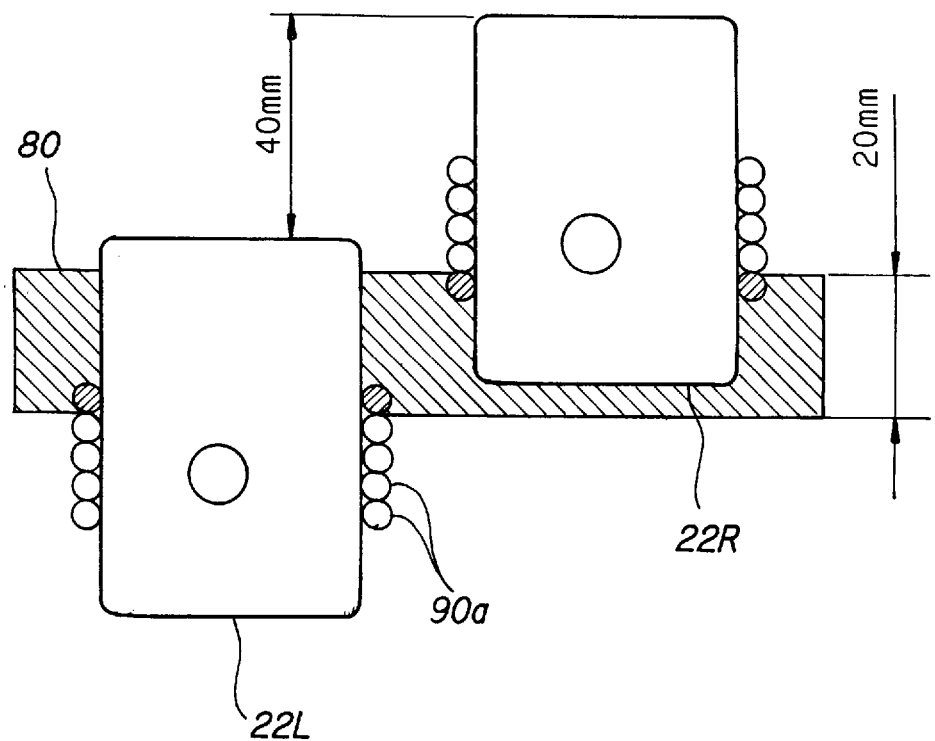
FIG. 7 is an explanatory plan view of the robot foot illustrated in FIG. 5 showing the detection of the optical detectors when the land comprises of black paint or the like applied on the stair step.

If the detection range is set at 15 mm, the positional error relative to the stair step in foot landing has to be kept within this range. Since the detection range of 15 mm is too small in actual practice, however, the detection range is expanded by the use of a landmark 80. More specifically, as shown in FIG. 7, the width of the landmark 80 is made approximately equal to the length of the optical detector array. (This width is exaggerated in the drawings.) Owing to the use of the landmark 80, the detection range can accordingly be increased by plus/minus 20 mm, i.e., 40 mm.

As shown in FIG. 7, the landmark 80 comprises of black paint or other light absorbing material applied in a straight pattern over a prescribed area of the floor surface. The optical detectors are OFF when they are on the landmark 80 or when the foot 22R(L) is off the floor, and are ON when they are brought into contact with the stair step in a place other than the landmark 80.

Figure 8:
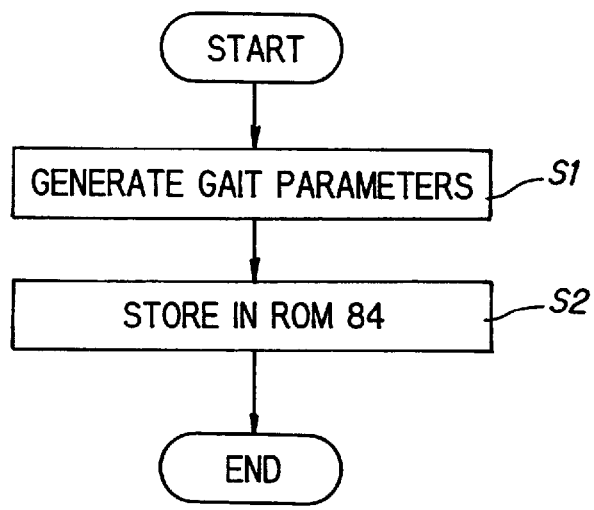
FIG. 8 is a flowchart showing the operation of the system according to the present invention concerning gait parameter generation of the robot.

Based on the foregoing, the operation of the system will now be explained with reference to the flowchart of FIG. 8.

As illustrated, the program begins in S1 in which gait parameters are generated or designed beforehand and the program proceeds to S2 in which the generated gait parameters are stored in the ROM 84. The gait parameters are expressed in terms of position (displacement) and orientation of the body, foot trajectories including foot landing position and some similar parameters.

The generation of the gait parameters will now be discussed in detail taking stair descending/ascending as example.

Figure 9:
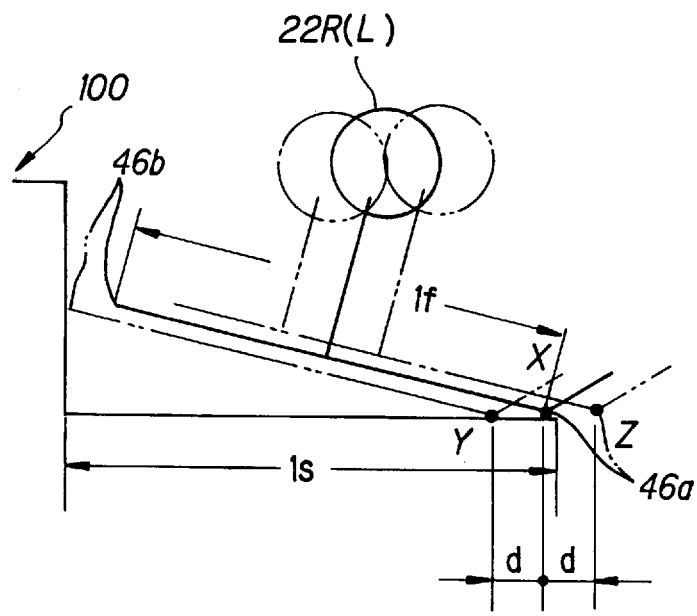
FIG. 9 is an explanatory view showing foot landing on a stair step.

The foot landing position will first be explained with reference to FIG. 9. As illustrated, assume that the foot length lf in the forward direction is slightly shorter than the depth ls of the stair step (tread) in the same direction.

When the foot 22R(L) has to be landed from its tiptoe 46a for the reason mentioned before, if the tiptoe is landed at a position X in the figure, no geometric problem arises and the robot can walk down the stairs with a stable posture. However, if the foot 22R(L) is landed at a position Y (before X) by an error d, the heel 46b hits the riser of the upper step (tread). On the other hand, if the foot is landed at a position Z (beyond X) by the error d, the robot misses foot the stair step. At any rate, when the foot length lf is longer than the stair step depth ls, a stable foot landing can no longer be expected.

Noticing this, the foot trajectories in the gait parameters should be designed in the following manner described in 3 features in the system according to the present invention.

Feature 1. The foot 22R(L) of a free leg should be landed or fallen on a stair step (tread) 100 from its heel 46b. Or the foot 22R(L) may be landed on a stair step at least keeping its sole substantially horizontally in parallel with the step during the foot landing. Saying this in other words, the foot must not be landed from its tiptoe. It should here be noted that the free leg is a leg which does not support the robot weight. The leg that supports the robot weight is called in the specification the supporting leg. When only one leg supports the weight, the situation is called the single-leg support phase, whereas if both legs support the weight, the situation is called the double-leg support phase.

Feature 2. All the time during the single-leg support phase, the supporting leg foot should be kept in surface-contact or in point-contact by at least three points. In other words, the foot should not be rotated about the y-axis (the axis 36) so that its heel 46b does not lift or raise from the stair surface.

Feature 3. The above shall be applied during the double-leg support phase. More specifically, both feet should be maintained in surface contact or at least three-point contact with a stair step so as not to be rotated about the y-axis until one foot is off the stair step.

In the above, what is meant by the "surface-contact" or "point-contact by at least three points" is that the foot is brought into contact with a stair step in the manner which ensures to control the robot locomotion to generate a floor reaction force to restore a stable posture, when the posture becomes unstable. What is meant by "the foot 22R(L) may be landed on a stair step at least substantially horizontally with the step" is that the foot should be landed certainly not from its tiptoe 46a.

Figure 10:
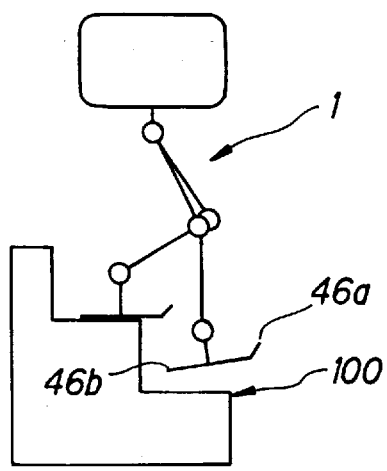
FIG. 10 is an explanatory view showing the robot stair descending during the single-leg support phase.
Figure 11:
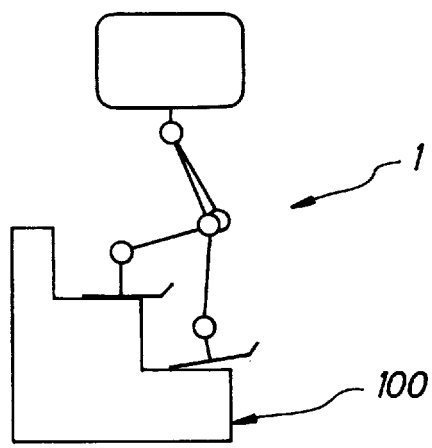
FIG. 11 is an explanatory view showing the robot foot is being landed on a stair step at the last aspect of the single-leg support phase.
Figure 12:
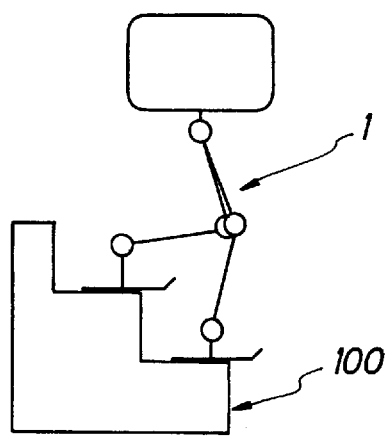
FIG. 12 is an explanatory view showing the robot foot is about to be lifted off a stair step at the last aspect of the double-leg support phase.
Figure 13:
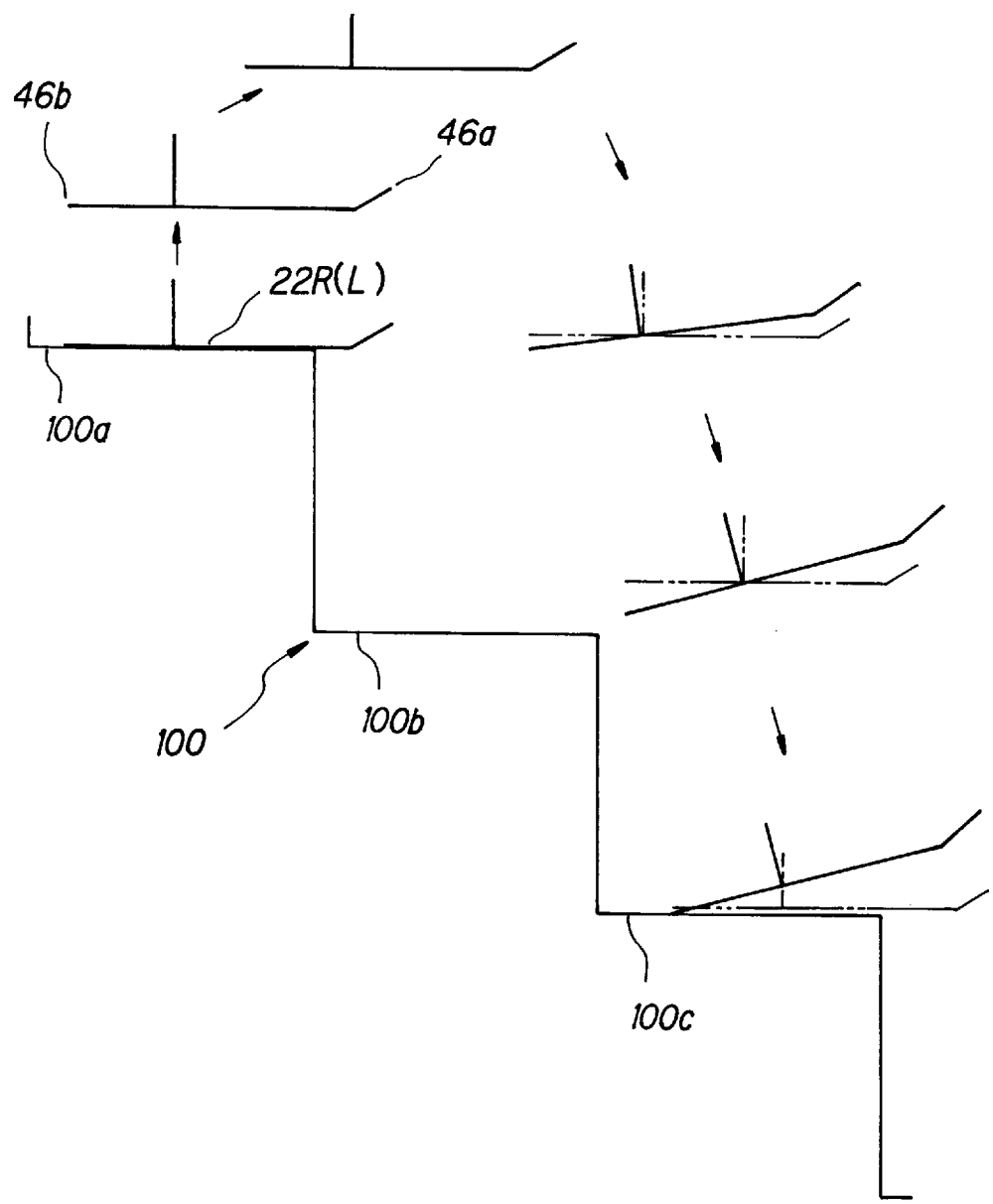
FIG. 13 is an explanatory view showing the foot trajectory during foot landing in the generated gait parameters in the system according to the present invention.

FIGS. 10 to 12 illustrate the manner of foot landing mentioned in the above. FIG. 10 shows the single-leg support phase, FIG. 11 illustrates that the support leg foot is being landed on a lower step and FIG. 12 depicts that the hind leg foot is being lifted off an upper step to be swung as a free leg. FIG. 13 shows a trajectory of the free leg foot. As illustrated, the free leg foot should be lifted vertically from a step 100a and then be landed from its heel on a third step 100c beyond a second step 100b where the supporting leg foot is placed (although it is not shown). As illustrated by phantom lines, the foot 22R(L) may be landed on the step such that its sole is kept substantially horizontally in parallel with the step during the foot landing.

In the system according to the invention, the above-mentioned foot trajectory and the position and orientation of the body and some similar parameters are designed in advance as the gait parameters and are stored beforehand in the ROM 84 of the control unit 26. The gait parameters should include the trajectory of the Zero Moment Point. The Zero Moment Point is a point at which no moment about the x-axis or y-axis arises and which is always within the support polygon formed by the foot sole contact points and the floor or is on any side of the polygon all the time while walking.

Figure 14:
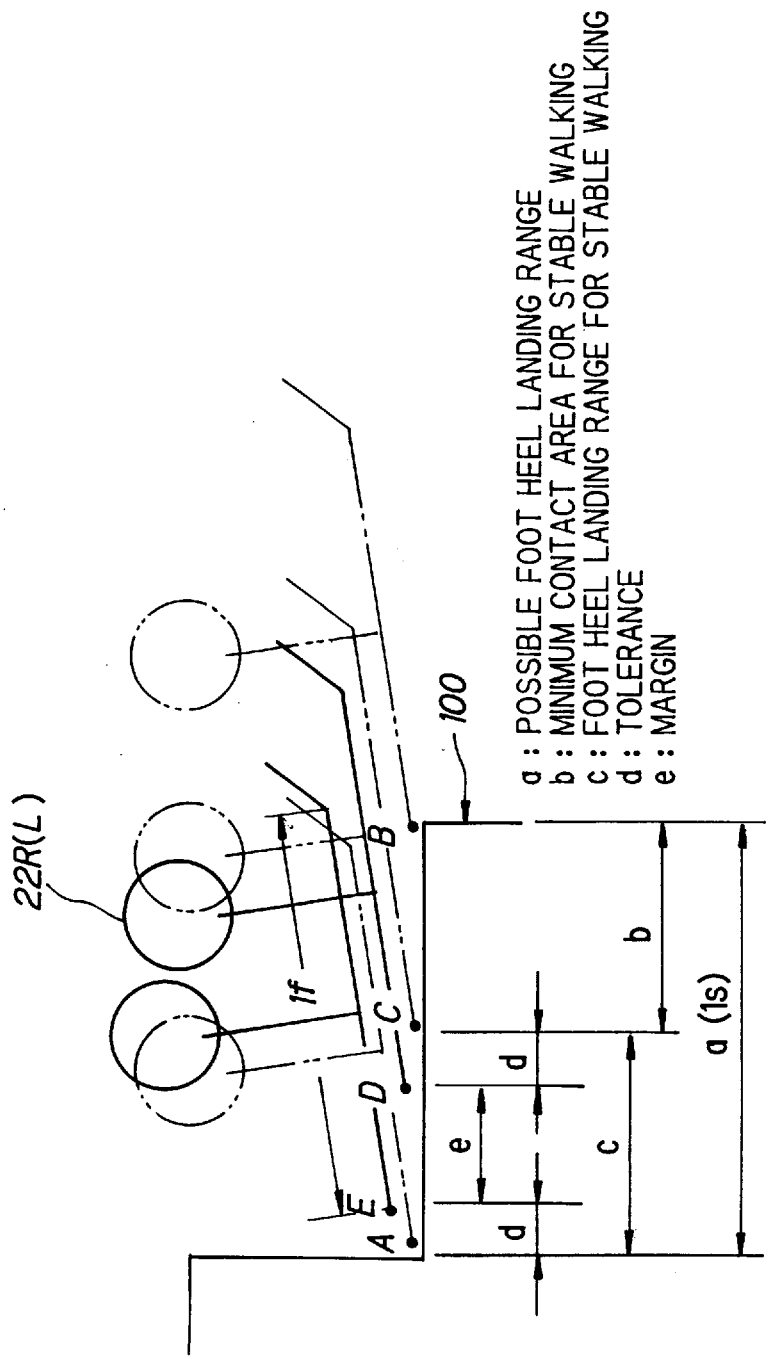
FIG. 14 is an explanatory view explaining the foot landing in the generated gait parameters in the system according to the present invention.

The feature mentioned in feature 1 will further be explained with reference to FIG. 14.

As mentioned earlier, the gait parameters are designed such that the foot 22R(L) is landed on a stair step from its heel. Again assuming that foot length lf is slightly shorter than the stair step depth ls, the heel of the foot may land at a position A or B. More specifically, the foot heel can be landed within a range a (=depth ls). If the foot heel is landed at the position B, stable walking will not be continued at the next single support phase since the foot is not supported by the stair step. Therefore, when the minimum contact area for ensuring a stable walking is defined as b, it suffices if the heel is landed before a position C, i.e., within a range c. In addition, without exception, a positional error will happen. The foot trajectory should be designed such that the heel does not hit an upper stair step or the riser thereof. Therefore, if the tolerance of positional errors is defined as d and when the foot trajectory is designed in such a manner that the heel lands within a range e between positions D and E, the minimum contact area can be achieved and the heel does no longer interfere with the upper stair step. Thus, it becomes possible to control robot stair descending with a margin of e such that the robot walks down the stairs with a stable posture until the margin e has decreased to zero. With the arrangement, the tolerance is thus increased.

The second and third features in foot landing mentioned in features 2 and 3 will further be discussed.

Figure 15:
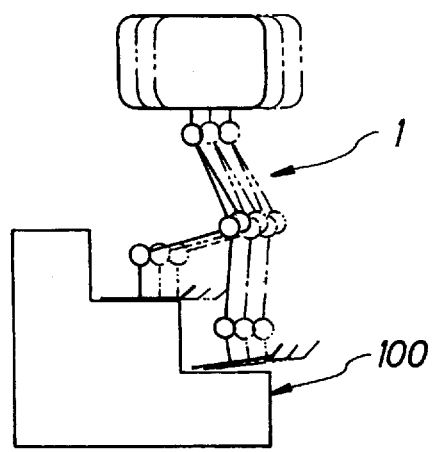
FIG. 15 is an explanatory view showing the foot is being landed on a stair step.
Figure 16:
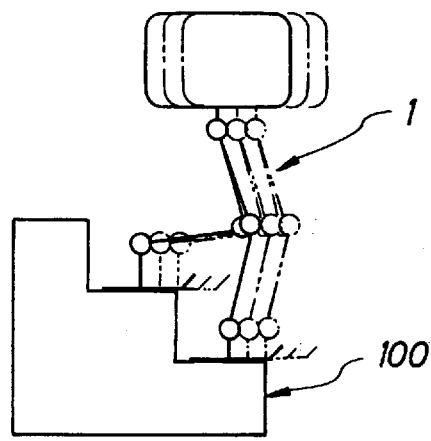
FIG. 16 is an explanatory view showing the foot is being lifted off a stair step.

As illustrated in FIGS. 10 to 12, the foot trajectory is designed in such a manner that the foot of the supporting leg during the single-leg support phase is prevented from rotating about the y-axis during the period, or the foot of the supporting leg during the double-leg support phase (which will be the free leg next) is prevented from rotating about the same axis during the period until one foot is off the stair step. As a result, a possible positional error will not cause the foot to be out of place or to interfere with an upper step. FIG. 15 illustrates the situation in which the foot is being landed on a step and FIG. 16 depicts the situation in which the hind leg foot is being taken off a step.

Figure 17:
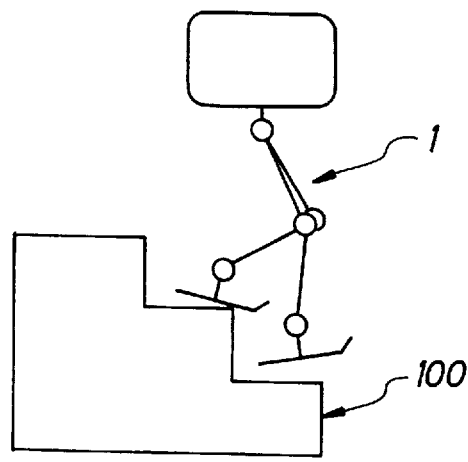
FIGS. 17 to 19 are explanatory views showing the robot descends stairs based on gait parameters generated without using the characteristic features of the system according to the present invention.
Figure 18:
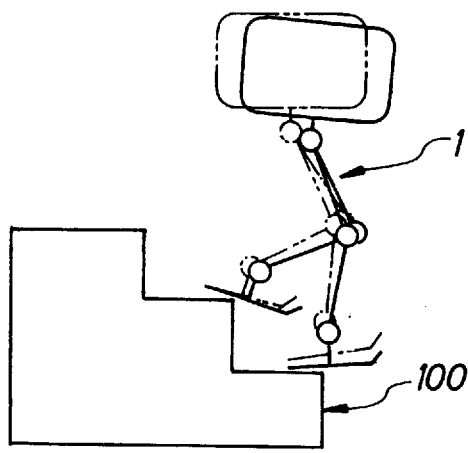
Figure 19:
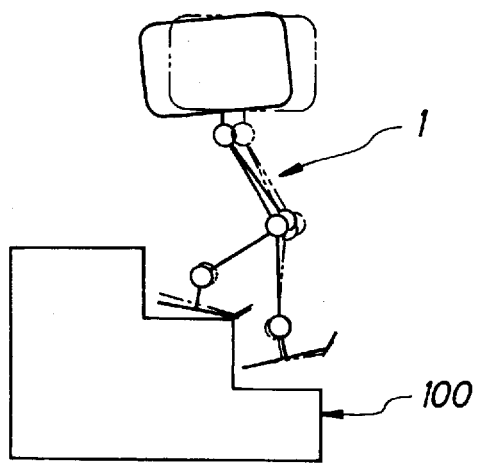

To be more specific, assuming that the robot walking is controlled in accordance with gait parameters designed without using the feature mentioned in feature 2, the foot of the supporting leg would be rotated at the time of foot landing. The robot posture would accordingly be those as shown in FIGS. 17 to 19. As illustrated, since the supporting leg foot is in "line-contact" (contact by two points) with the stair step, it is impossible to control the robot locomotion to cause the robot to brace the leg if the robot posture becomes unstable. In order to enhance the stability during walking, therefore, it becomes necessary to solve complicate equations to satisfy the dynamic equilibrium in every phase, necessitating a high performance on-board computer.

Moreover, if a more precise foot landing position is needed, this would restrict other robot locomotion control which changes a foot landing position in response to an unstable posture. In the figures, the tiptoe protrudes from the stair step, the step edge acts as the center of rotation (the point of action of the force).

The second problem is a problem that occurs when the robot descends stairs with his foot partially protruded from the stair step edge. This relates to both the features mentioned in features 2 and 3.

Figure 20:
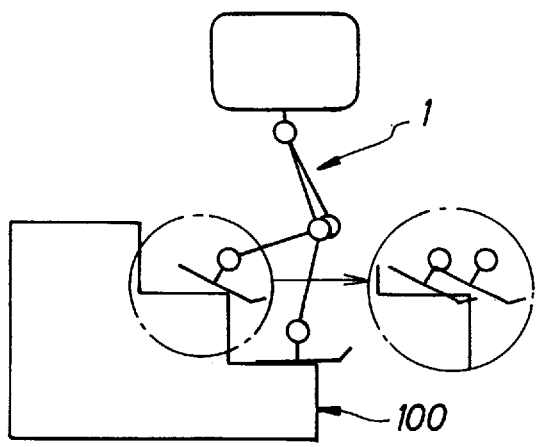
FIGS. 20 to 22 are explanatory views, similar to FIGS. 17 to 19, and showing the robot descends stairs based on gait parameters generated without using the characteristic features of the system according to the present invention.
Figure 21:
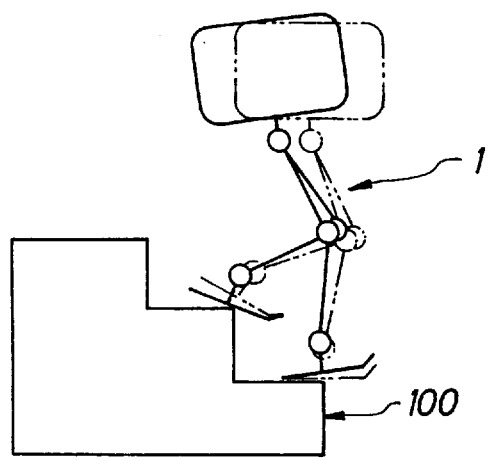
Figure 22:
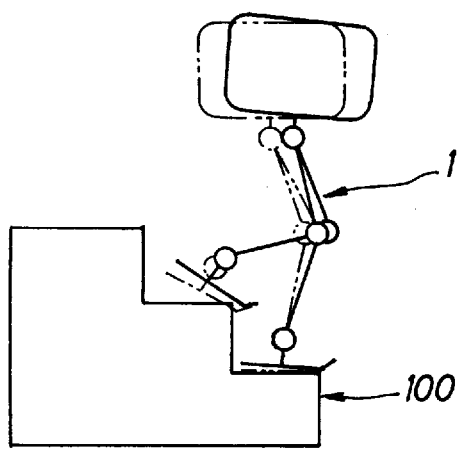

Assuming that the robot stair descending is controlled in accordance with gait parameters designed without using the feature mentioned in feature 3, let us discuss the timing of lifting or raising of supporting leg foot. This is the last aspect of the double-leg support phase. FIGS. 20 to 22 show this.

Suppose that the foot landing position deviated and the center of foot rotation advanced to the stair step edge as illustrated in FIG. 20 and what was worse, the robot body position was erroneously controlled in the forward direction as depicted by phantom lines in FIG. 21. In this situation, since the hind leg is not able to kick the stair step forwards, the robot would toppled back. If the robot body deviates back as shown by phantom lines in FIG. 22, on the contrary, the hind leg foot becomes too close to the stair step so that the forward force generated by kicking becomes stronger than desired, causing the robot to topple forward.

Similarly assuming that the robot stair descending is controlled in accordance with gait parameters designed without using the feature mentioned in feature 2, let us discuss the landing of the supporting leg foot (the last aspect of the single-leg support phase). Suppose that the supporting leg foot is rotated about the stair step edge as illustrated in FIG. 17 and the robot body deviates backwards as shown by thick lines in FIG. 18. As a result, the floor reaction force shifts backwards, the moment generated would cause the robot to topple forward. On the other hand, if the robot body deviates back as shown by thick lines in FIG. 19, the floor reaction force will accordingly shift forward, causing the robot to topple back.

Thus, when gait parameters are designed without using the features mentioned in features 1, 2 and 3, it is difficult to control the locomotion for the robot to descend stairs if the foot length is greater than the stair step depth. If a positional error of foot landing becomes great, it becomes impossible to control the robot stair descending with a stable posture.

Since the landing position of the foot on a stair step can precisely be detected by the aforesaid optical detectors 90 on a real-time basis, it might be said that it is not always impossible to generate gait parameters on a real-time basis such that the robot descends stairs with a stable posture. Or, it might be said that it is not always impossible to conduct a stable robot stair descending control even when the robot foot is in line-contact with a stair step. However, these would require to solve various equations satisfying the dynamic equilibrium and complicated algorithms to generate gait parameters on a real-time basis, making it necessary to install a high performance on-board computer.

In the gait parameter generation in the system according to the present invention using the features mentioned in features 1, 2 and 3, these requirements are not needed. With the arrangement, it becomes possible to control the locomotion such that the robot descends stairs with a stable posture even when the foot length is greater than the stair step depth. This makes it possible to design the size of foot independent of the size of stairs. The foot can be made in a larger size if that is effective in walking in an environment other than stairs. Moreover, with the arrangement, the tolerance of positional errors is increased, increasing the number of stair steps that the robot descends continuously keeping a stable posture.

Based on the above, the locomotion control of the system will now be explained with reference to the flowchart shown in FIG. 23.

The program begins in S10 in which various parts of the system are initialized and proceeds to S12 in which the gait parameters thus generated or designed are read from the ROM 84. The program then goes to S14 where it waits for a start signal and when the start signal is issued, the program advances to S16 in which a counter is incremented, to S18 in which it is checked whether it is a timing to conduct a gait parameter correction. This will be explained later.

The program then proceeds to S20 in which posture parameters are determined or calculated. The gait parameters referred to earlier include parameters to be obtained through interpolation and in this step the parameters are calculated additionally. Based on the generated and calculated gait parameters, the posture parameters are determined or calculated at the time designated by the counter. The program then proceeds to S22 in which desired angles of the aforesaid twelve joints are determined or calculated through the inverse kinematic solution based on the determined posture parameters in a known manner. The program then goes to S24 in which a synchronization signal is waited for and upon receipt thereof, the program moves to S26 in which the calculated desired joint angles are output, to S28 in which it is checked whether the locomotion is to be stopped. If the result is negative, the program returns to S16 and the same procedures are repeated until the result in S28 becomes affirmative, at which time the program goes to S30 in which the counter is reset and the routine is terminated.

Figure 24:
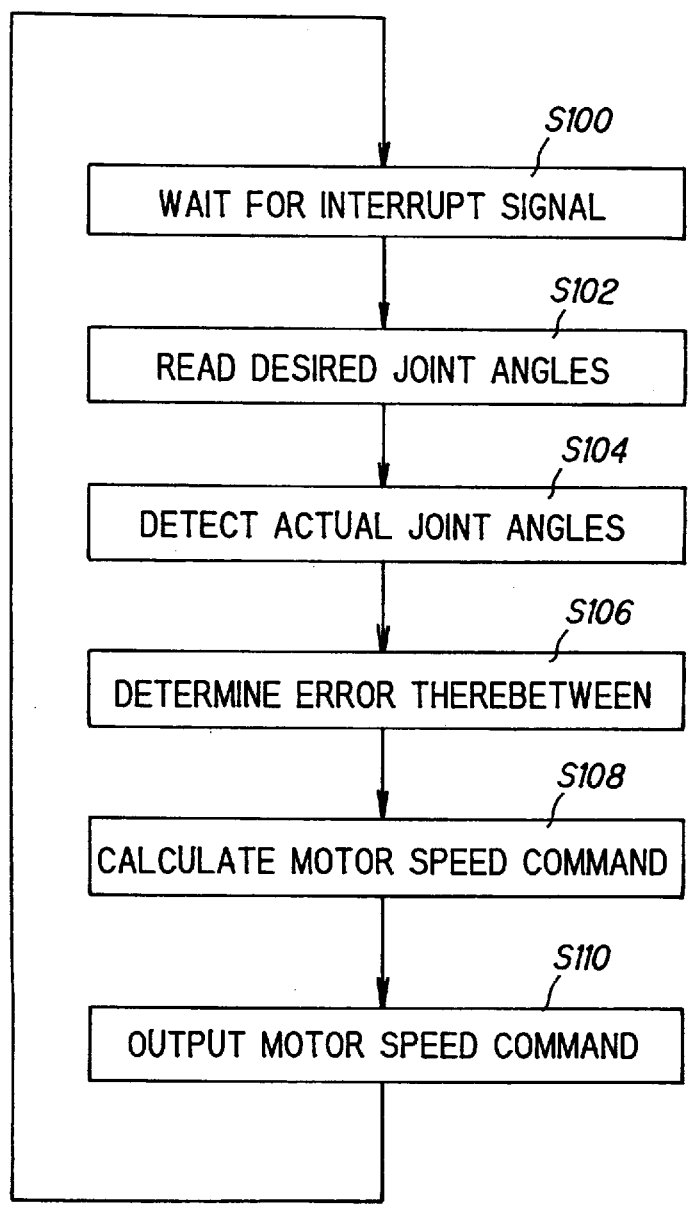
FIG. 24 is a flowchart, similar to FIG. 23, but showing servo control based on the desired joint angles determined in the flowchart of FIG. 23.

Thus, the loop consisting of S16 to S28 is executed once every unit time period (e.g., 20 ms) of the counter. In parallel with the execution of this routine, the second CPU 82 conducts servo control in accordance with the routine consisting of S100 to S110 illustrated in the flowchart of FIG. 24 for tracking the desired joint angles output in S26. Since such a kind of servo control is known, so no further explanation is made.

Figure 23:
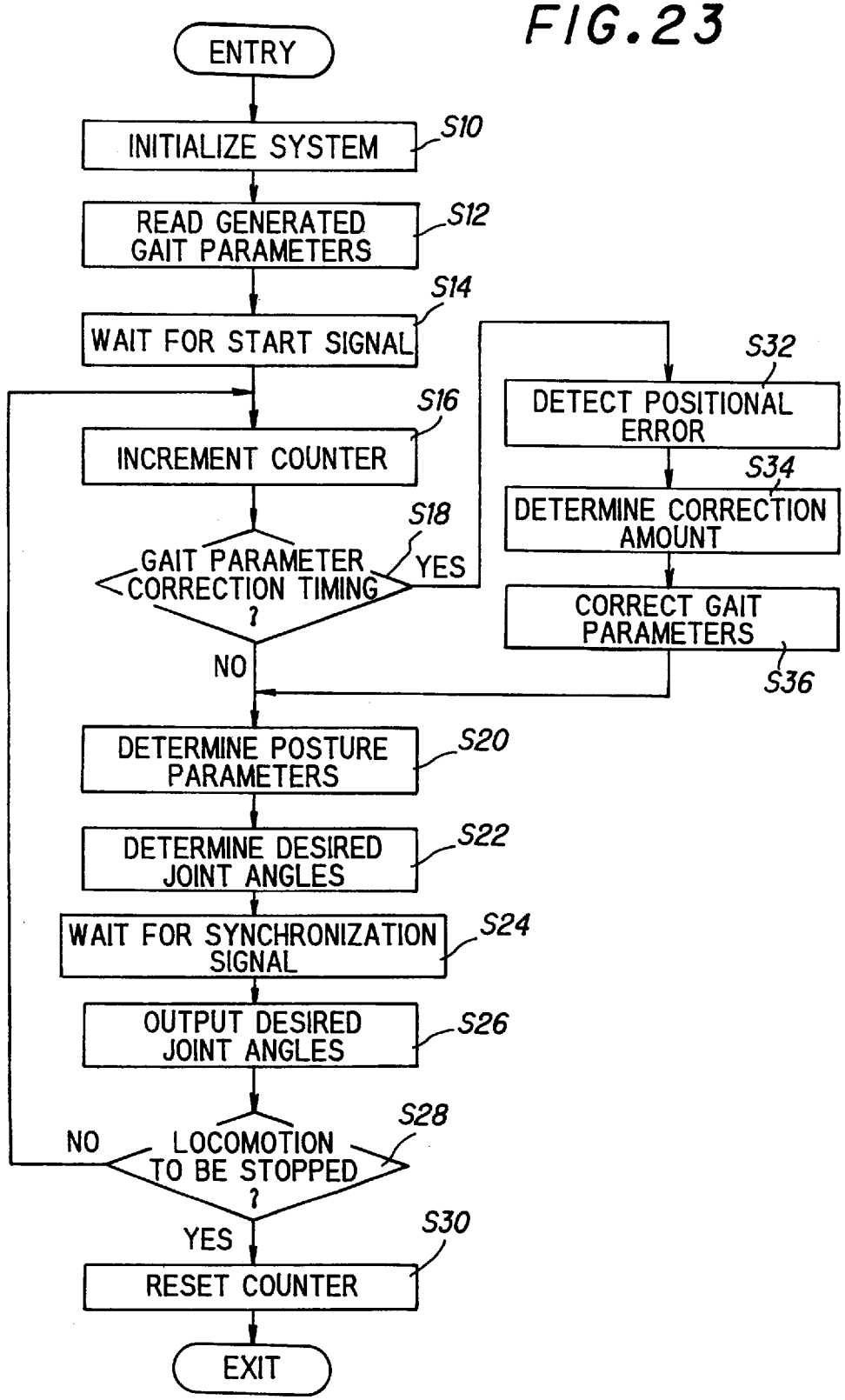
FIG. 23 is a flowchart showing the operation of the system according to the present invention concerning the locomotion control of the robot to determine desired joint angles.

Explaining S18 in the flowchart of FIG. 23, it is checked whether it is time to conduct the gait parameter correction. The time of foot lifting is defined as the correction timing in this embodiment, since this makes it possible to utilize the entire period during which the foot is free for correcting the free leg trajectory based on the positional error detected and fedback to the desired foot landing position at the very beginning of the period, thereby enabling a smooth (not jerky) transition to the corrected gait and minimizing gait stability degradation, and in addition, this makes it possible to use the most recent positional error.

When the result in S18 is affirmative, the program goes to S32 in which the positional error of the foot 22R(L) is ascertained by using the output of the optical detectors 90 to detect the foot landing position and then by comparing it with the desired foot landing position determined in the gait parameters. The program then goes to S34 in which a correction amount is determined such that the error is not accumulated and to S38 in which the desired foot landing position in the gait parameters is corrected. When the desired foot landing position is corrected, the desired stride is changed. Since the foot landing position is expressed in terms of position (displacement) in the x, y and z-axes and the rotation thereabout, some or all of the parameters are corrected such that the stride becomes as desired. Repeating the foregoing procedures during stair descending prevents the accumulation of positional errors and enables the robot to successfully walk down stair steps successively.

With the arrangement, the system makes it possible to control the robot locomotion such that the robot descends stairs with a stable posture even when the foot length is greater than the stair step depth. This also makes it possible to design the size of the foot independent of the size of the stairs. Moreover, the tolerance of positional errors is increased, increasing stair steps that the robot descends continuously keeping a stable posture.

While the description has been made taking the biped robot to descend stairs, the invention will similarly be applied in controlling the robot locomotion when the biped robot ascend stairs with its back forward.

While the gait parameters are generated in advance, it is alternatively possible to generate them on a real-time basis.

While only the two-legged walking robot has been described above, the principles of the present invention are basically applicable to walking robots with three or more legs.

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A system for controlling locomotion of a legged mobile robot having at least a body and a plurality of articulated legs each connected to the body through a joint and each including a foot connected to the leg through a joint, the robot being configured to walk in an environment including stairs, comprising:

gait parameter generating means for generating gait parameters of the robot such that the robot descends the stairs by landing a heel of a first foot on a stair step;

posture parameter determining means for determining posture parameters of the robot based on the generated gait parameters;

joint angle determining means for determining desired angles of the joints based on the determined posture parameters by inverse kinematic solution; and servo control means for controlling an actuator of each joint in response to the determined desired angles of the joints;

wherein the robot is a biped robot having two articulated legs each connected to the body through a hip joint and each including a foot connected to the leg through an ankle joint, such that the robot walks alternating between a single-leg support phase in which one of the two legs supports the weight of the robot, and a double-leg support phase in which both legs support the weight of the robot, and said gait generating means generates gait parameters which throughout the entire single-leg support phase, cause the foot supporting the weight of the robot to make at least three-point contact with the stair step.

2. A system according to claim 1, wherein said gait generating means generates gait parameters such that the first foot lands on the stair step in a horizontal orientation.

3. A system according to claim 1, wherein said gait generating means generates the gait parameters in such a manner that the foot is kept not rotated in the single-leg support phase about an axis perpendicular to a direction in which the robot walks.

4. A system according to claim 3, wherein said gait generating means generates the gait parameters in such a manner that the heel is kept not lifted in the single-leg support phase.

5. A system according to claim 1, wherein the robot is a biped robot having two articulated legs each connected to the body through a hip joint and each including a foot connected to the leg through an ankle joint such that the robot walks alternating a single-leg support phase in which one of the two legs supports weight of the robot and a double-leg support phase in which the two legs support the weight of the robot, and said gait generating means generates the gait parameters in such a manner that the foot is in surface-contact or in point-contact by at least three points in the double-leg support phase until one of the two legs is off the stair step.

6. A system according to claim 5, wherein said gait generating means generates the gait parameters in such a manner that the foot is kept not rotated in the double-leg support phase about an axis perpendicular to a direction in which the robot walks until one of the two legs is off the stair step.

7. A system according to claim 6, wherein said gait generating means generates the gait parameters in such a manner that the heel is kept not lifted in the double-leg support phase until one of the two legs is off the stair step.

8. A method of controlling locomotion of a legged mobile robot having at least a body and a plurality of articulated legs each connected to the body through a joint and each including a foot connected to the leg through a joint, the robot being configured to walk in an environment including stairs, comprising the steps of:

generating gait parameters of the robot such that the robot descends the stairs by landing the heel of a first foot on a stair step;

determining posture parameters of the robot based on the generated gait parameters;

determining desired angles of the joints based on the determined posture parameters by inverse kinematic solution; and servo controlling an actuator of each joint in response to the determined desired angles of the joints;

wherein the robot is a biped robot having two articulated legs each connected to the body through a hip joint and each including a foot connected to the leg through an ankle joint, such that the robot walks alternating between a single-leg support phase in which one of the two legs supports the weight of the robots and a double-leg support phase in which both legs support the weight or the robot, and said gait parameters are generated to cause the first foot, which supports the weight of the robot in the single-leg support phase, to make at least three point contact with the stair step, throughout the entire single-leg support phase.

9. A method according to claim 8, wherein said gait parameters are generated such that the foot is landed on the stair step keeping a sole of the foot horizontally in parallel with the stair step.

10. A method according to claim 8, wherein said gait parameters are generated in such a manner that the foot is kept not rotated in the single-leg support phase about an axis perpendicular to a direction in which the robot walks.

11. A method according to claim 10, wherein said gait parameters are generated in such a manner that the heel is kept not lifted in the single-leg support phase.

12. A method according to claim 8, wherein the robot is a biped robot having two articulated legs each connected to the body through a hip joint and each including a foot connected to the leg through an ankle joint such that the robot walks alternating a single-leg support phase in which one of the two legs supports weight of the robot and a double-leg support phase in which the two legs support the weight of the robot, and said gait parameters are generated in such a manner that the foot is in surface-contact or in point-contact by at least three points in the double-leg support phase until one of the two legs is off the stair step.

13. A method according to claim 12, wherein said gait parameters are generated in such a manner that the foot is kept not rotated in the double-leg support phase about an axis perpendicular to a direction in which the robot walks until one of the two legs is off the stair step.

14. A method according to claim 13, wherein said gait parameters are generated in such a manner that the heel is kept not lifted in the double-leg support phase until one of the two legs is off the stair step.

* * * * *